(12) United States Patent
Colloms et al.

(10) Patent No.: US 9,804,673 B2
(45) Date of Patent: Oct. 31, 2017

(54) TOUCH SENSITIVE DEVICE

(75) Inventors: Martin Colloms, Cambourne (GB);
Timothy Christopher Johnson Whitwell, Hong Kong (CN)

(73) Assignee: NVF TECH LTD., Cambridgeshire (GB)

( * ) Notice: Subject to any disclaimer, the term of this patent is extended or adjusted under 35 U.S.C. 154(b) by 0 days.

(21) Appl. No.: 13/201,754

(22) PCT Filed: Feb. 12, 2010

(86) PCT No.: PCT/GB2010/050230
§ 371 (c)(1),
(2), (4) Date: Oct. 20, 2011

(87) PCT Pub. No.: WO2010/092397
PCT Pub. Date: Aug. 19, 2010

(65) Prior Publication Data
US 2012/0038568 A1    Feb. 16, 2012

(30) Foreign Application Priority Data

Feb. 16, 2009  (GB) .................................. 0902499.3

(51) Int. Cl.
*G08B 6/00* (2006.01)
*G06F 3/01* (2006.01)

(52) U.S. Cl.
CPC ......... *G06F 3/016* (2013.01); *Y10T 29/49004* (2015.01)

(58) Field of Classification Search
CPC ........................... G06F 3/016; Y10T 29/49004
USPC ......................................... 345/156, 170–177
See application file for complete search history.

(56) References Cited

U.S. PATENT DOCUMENTS

| 6,680,729 | B1 * | 1/2004 | Martin et al. .................. 345/156 |
| 7,446,752 | B2 * | 11/2008 | Goldenberg et al. ......... 345/156 |
| 7,561,142 | B2 * | 7/2009 | Shahoian et al. ............. 345/156 |
| 8,169,402 | B2 * | 5/2012 | Shahoian et al. ............. 345/156 |
| 8,701,132 | B2 * | 4/2014 | Kawabata ...................... 720/695 |
| 8,884,884 | B2 * | 11/2014 | Cruz-Hernandez et al. . 345/173 |
| 2001/0006006 | A1 * | 7/2001 | Hill ................................ 73/606 |
| 2005/0017947 | A1 | 1/2005 | Shahoian |
| 2005/0078093 | A1 * | 4/2005 | Peterson, Jr. ........... G06F 3/043 345/173 |
| 2006/0119589 | A1 * | 6/2006 | Rosenberg et al. ........... 345/173 |
| 2006/0181517 | A1 * | 8/2006 | Zadesky et al. ............... 345/173 |
| 2007/0278033 | A1 * | 12/2007 | Bank et al. .................... 181/161 |
| 2008/0084384 | A1 * | 4/2008 | Gregorio et al. ............. 345/156 |
| 2008/0186152 | A1 * | 8/2008 | Kyung et al. ............. 340/407.1 |
| 2008/0198139 | A1 | 8/2008 | Lacroix |
| 2008/0231612 | A1 * | 9/2008 | Hill et al. ..................... 345/177 |

(Continued)

FOREIGN PATENT DOCUMENTS

WO    WO 2008/045694 A1    4/2008

*Primary Examiner* — Tony Davis
(74) *Attorney, Agent, or Firm* — Gable Gotwals

(57) ABSTRACT

A method of making a touch-sensitive data entry screen of the kind arranged to provide haptic response to a user via at least one electromechanical exciter coupled to the screen, comprising analyzing the mechanical and electromechanical coupled system represented by the data entry screen and the at least one exciter, and selecting values of parameters of the coupled system to provide a required displacement and acceleration of the screen at low frequency in response to human touch.

24 Claims, 9 Drawing Sheets

(56) References Cited

U.S. PATENT DOCUMENTS

| | | | |
|---|---|---|---|
| 2009/0009488 A1* | 1/2009 | D'Souza | G06F 3/0436 345/177 |
| 2009/0243997 A1* | 10/2009 | Tierling | G06F 3/016 345/156 |
| 2010/0013799 A1* | 1/2010 | Kim | G06F 3/0433 345/177 |
| 2010/0245254 A1* | 9/2010 | Olien et al. | 345/173 |
| 2010/0282524 A1* | 11/2010 | Linotte | G06F 3/0416 178/18.01 |
| 2011/0074544 A1* | 3/2011 | D'Souza | G06F 3/0433 340/5.83 |
| 2011/0102349 A1* | 5/2011 | Harris | G06F 3/041 345/173 |

* cited by examiner

TOUCH SENSITIVE DEVICE

TECHNICAL FIELD

The invention relates to touch sensitive devices including touch sensitive screens or panels.

BACKGROUND ART

U.S. Pat. No. 4,885,565, U.S. Pat. No. 5,638,060, U.S. Pat. No. 5,977,867, US2002/0075135 describe touch-operated apparatus having tactile feedback for a user when touched. In U.S. Pat. No. 4,885,565 an actuator is provided for imparting motion to the CRT when the actuator is energised to provide tactile feedback. In U.S. Pat. No. 5,638,060, a voltage is applied to a piezo-electric element which forms a switch to vibrate the element to apply a reaction force to a user's finger. In U.S. Pat. No. 5,977,867, a tactile feedback unit generates a mechanical vibration sensed by the user when the touch screen is touched with a finger or a pointer. The amplitude, vibration frequency and pulse length of the mechanical vibration are controlled, with the pulse width being long enough to be felt but short enough to terminate before the next key touch. US2002/0075135 describes the use of a second transducer to provide a pulse in the form of transient spike to simulate a button click.

WO 2008/045694 A1 of Immersion Corporation discloses a haptic effect device including a housing and a touchscreen coupled to the housing through a suspension. An actuator is coupled to the touchscreen. The suspension is tuned so that when the actuator generates first vibrations at a first frequency, the first vibrations are substantially isolated from the housing and are applied to the touchscreen to simulate a mechanical button. Further, when the actuator generates second vibrations at a second frequency, the second vibrations are substantially passed through to the housing to create a vibratory alert.

Other touch sensitive devices are described in US 2001/006006, US 2007/080951, US 2009/181724, US 2007/080951, US 2009/181724, WO 2008/151863, US 2009/189873, US 2009/267892, US 2008/100568, US 2007/024593, WO 2009/074826, JP 2009/245105 and US 2007/236450.

DISCLOSURE OF INVENTION

According to one aspect of the invention, there is provided a method of making a touch-sensitive data entry screen of the kind arranged to provide haptic response to a user via at least one electromechanical exciter coupled to the screen, comprising resiliently mounting the touch sensitive data entry screen on a suspension, analysing the mechanical and electromechanical coupled system represented by the data entry screen, suspension and the at least one exciter, and selecting values of parameters of the coupled system to provide a required displacement and acceleration of the screen at low frequency in response to human touch.

The analysis may comprise analysing the resonance of the or each exciter. Each exciter may have the same or different resonance(s). The analysis may comprise analysing the resonance of the resiliently suspended screen. The coupled resonance of the resiliently mounted screen and exciter may also be included in the analysis.

The method includes identification of the output response, in terms of acceleration and displacement of the touch surface. The parameters which may be included in the analysis are selected from one or more of the electrical and mechanical proprieties of the at least one exciter, the efficiency and electronic properties of the or each drive amplifier and the coding and shaping of the electrical drive signals for desired haptic output.

The mechanical properties of the surface of the screen may also be matched by including the screen in the analysis as a whole body resonant system, where the Q factor, moving mass and compliance of the screen, are included in the mechanical matching to both the electrical and mechanical components of the exciter. In other words, the analysis may employ the surface supported resonance.

The selection of values may comprise improving the electrical efficiency and/or the mechanical footprint, in particular the resulting thickness, of the coupled system. The selection of values may comprise selecting some or all of the screen parameters (including but not limited to size, material, weight), exciter parameters (including but not limited to size, height, internal resonance) and the parameters of any screen suspension (including but not limited to material and location on the screen).

The screen may have a size of at least 200 mm and/or a mass of at least 200 gms. For example, the screen may be suitable for use in a netbook or similar device. The screen may comprise a liquid crystal display (LCD) screen and a touch screen. Both the LCD screen and touch screen may be co-extensive.

The required screen acceleration ranges from 5 to 50 m/s$^2$, and may be greater than 15 m/sec perhaps of the order of 20 m/s$^2$.

The or each exciter may be coupled to the screen to excite the screen into out-of-plane movement and/or in-plane movement and/or rocking displacement. For out-of-plane movement, the screen may thus be operating pistonically (i.e. in whole body resonance). The or each exciter may be an inertial electromagnetic exciter. Such exciters are well known in the art e.g. from WO97/09859, WO98/34320 and WO99/13684, belonging to the applicant and incorporated herein by reference. Alternatively, at least one exciter may be a piezoelectric transducer, a magneto-strictive exciter or a bender or torsional transducer (e.g. of the type taught in WO 00/13464). A plurality of exciters (perhaps of different types) may be selected to operate in a co-ordinated fashion.

The haptic signal may provide the sensation of a button click to a user. Alternatively, a complex haptic signal (in terms of produced displacement and/or acceleration) may be generated to provide additional information to the user. The haptic response signal may be associated with a user action or gesture etc. Alternatively, or additional, the haptic signal may be associated with the response of the screen in terms of display action or reaction.

A switching amplifier may be employed to feed haptic signals to the or each exciter and may output a signal in the form of a low pass filtered waveform. The amplifier output waveform may at least approximate to a square waveform.

According to another aspect of the invention, there is provided touch screen apparatus having haptic response to a user made by the method of any preceding claim.

The apparatus may comprise means to produce an acoustic signal, e.g. a bending wave loudspeaker, for example as shown in WO00/02417 (incorporated herein by reference) which discloses a combination loudspeaker and visual display device comprising a transparent bending wave speaker spaced from the front of a display screen by a small spacing air layer. Alternatively, the loudspeaker functionality may be incorporated by appropriate excitation of the touch screen itself, using the teaching of WO97/09842 (incorporated herein by reference). Such an acoustic signal may produce audio output which reinforce the beneficial association between haptics signal, user actions and/or apparatus responses.

The apparatus may comprise an electronic display, e.g. LCD. The apparatus may comprise a switching amplifier for feeding haptic signals to the or each exciter.

BRIEF DESCRIPTION OF DRAWINGS

The invention is diagrammatically illustrated, by way of example, in the accompanying drawings in which:

FIG. 1b shows a cross-section of the touch sensitive device of FIG. 1a;

DETAILED DESCRIPTION OF DRAWINGS

Figure 1A:
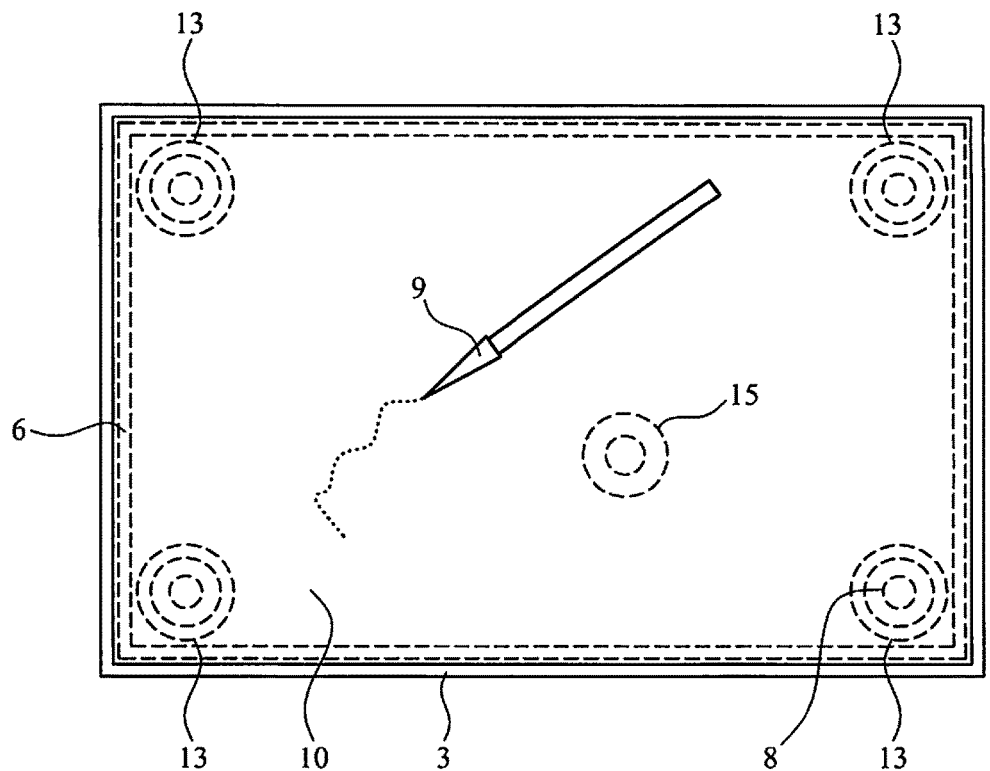
FIG. 1a shows a plan view of touch sensitive apparatus.
Figure 1B:
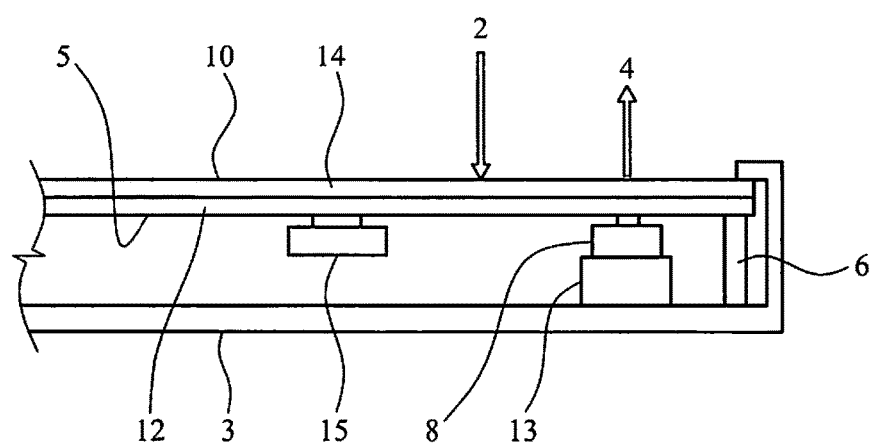

FIGS. 1a and 1b shows a touch sensitive device suitable for Netbook and other similar sized applications. A Netbook is a type of laptop computer that is small and light with reduced specifications and processing power relative to larger laptops. Netbooks are generally well-suited for accessing web-based or Internet applications. However, they are often are less appropriate for running complex or resource-intensive applications. Such devices typically have a generally rectangular touch sensitive screen with a diagonal of 8 to 10 inches. Similar sized touch sensitive screens are found in other applications, e.g. photocopier screens. In these fields the device may be driven by an electromechanical exciter comprising a vibration device such as a spring loaded mass type used in mobile phones or the type with rotating shaft and eccentric weight. In other words, prior art devices typically use exciters which are small motors. Both the known types have drawbacks including insufficient acceleration, slow response times, low efficiency and an inability to properly translate more complex modulated haptics signals into tactile user sensations.

As shown in FIGS. 1a and 1b, the device comprises a touch-sensitive data entry screen 5 in the form of an LCD panel 12 adjacent a coextensive touch screen 14. A user may contact the panel-form touch screen with a finger or with a stylus 9 as shown. The LCD screen 12 is mounted to a grounded frame 3 using a resilient foamed plastic suspension 6 which extends around the periphery of the screen 5. Four low profile electrodynamic exciters 13 are mounted to the frame 3, one at each corner, and are coupled by means of couplers 8 to the rear of the LCD screen to excite resonant bending wave excitation in the LCD screen. These exciters are thus grounded but inertial exciters (i.e. exciters which are not mounted to a frame) may also be used or a combination of inertial and grounded exciters. The excitation is such as to produce a "haptic" sensation, i.e. a force feedback, to a user touching the touch sensitive device. The exciters 13 apply a modulated or transient spike signal to the panel when it is touched on its surface 10 by a user's finger tip, as indicated by the arrow 2, and applies an opposing feedback force to the finger tip, as indicated by the arrow 4, to simulate a button or key click. The exciters used are off-the-shelf units designed for broadband acoustic operation. It is anticipated that more powerful units could be developed given the considerably reduced bandwidth requirement of a haptic application An additional transducer 15 is also shown mounted to the rear or internal surface of the screen 5 to apply bending wave energy to the screen 5 to produce an acoustic output. This transducer is inertial and is optionally included and may be of the kind described in WO97/09842 or of the kind described in WO01/54450. Following the teaching of WO97/09842, the exciter is mounted towards the centre of the panel to optimally drive bending wave vibration in the screen.

Figure 2:
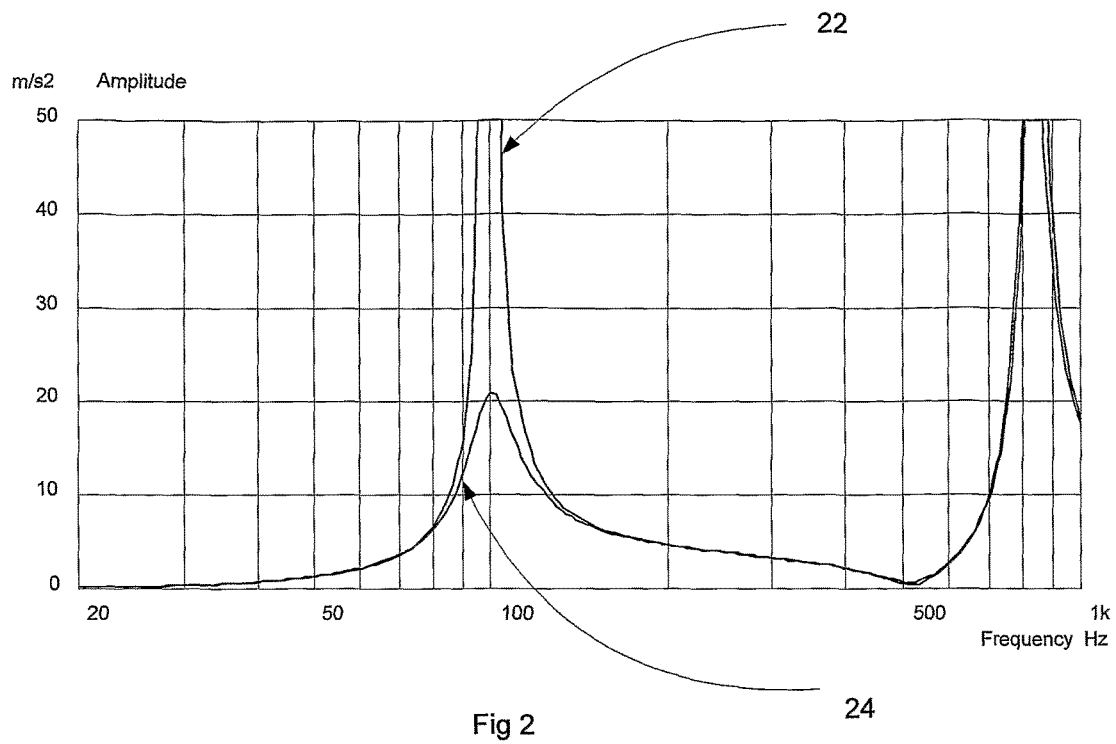
FIG. 2 shows the simulated amplitude of the acceleration as it varies with frequency for the screen of FIG. 1 mounted on a foamed plastic suspension having zero damping and one with some damping, respectively.
Figure 3:
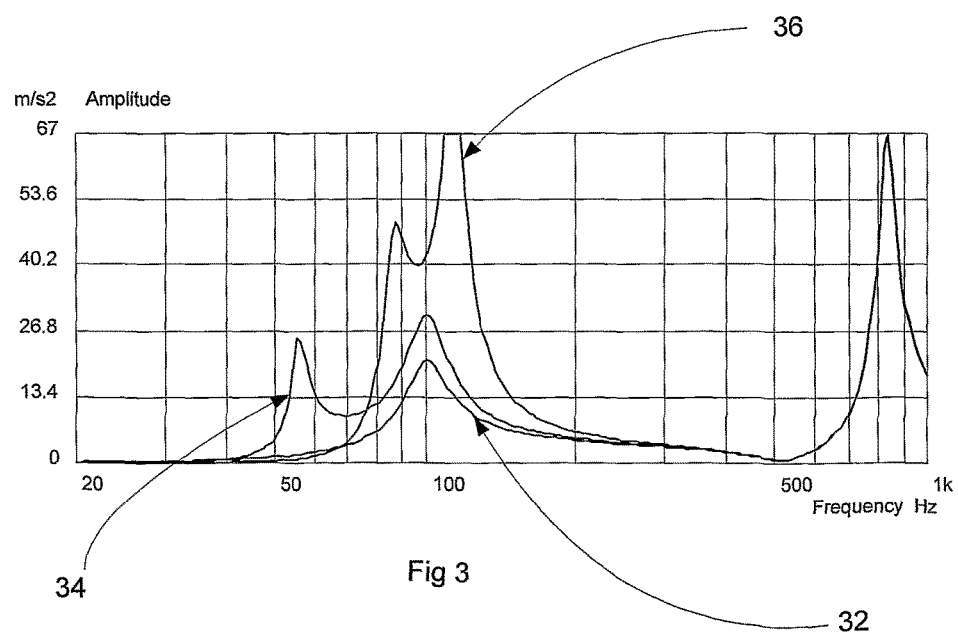
FIG. 3 shows the simulated amplitude of the acceleration varying with frequency for the screen of FIG. 1 driven by a grounded exciter, an inertial exciter and a tuned inertial exciter, respectively.
Figure 4:
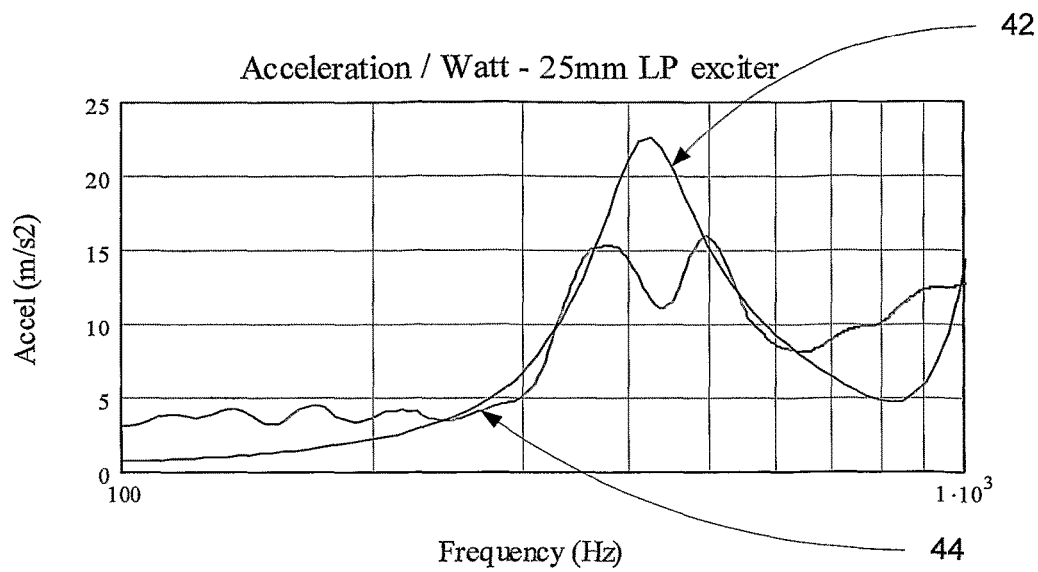
FIG. 4 shows the simulated amplitude of the acceleration varying with frequency for the screen of FIG. 1 and the amplitude derived from acoustic SPL measurement.

FIGS. 2 to 4 show some results of simulations and experimentation based on a test-bed device having a 9" LCD screen. For modelling the system, the LCD screen mass is set as 183 g and an estimated 64 g is added for the touch screen giving a total screen mass of approximately 250 g. The material of the touch screen is set as 1 mm glass of the same area as the LCD screen. The exciter is selected to be a 4 ohm electromagnetic device with a 25 mm diameter voice coil and a low profile design (i.e. thickness <6 mm).

Initially, the target resonant frequency of the total screen mass resonating on the compliance of the mounting suspension is set at 100 Hz and the foam stiffness is selected to give this desired 100 Hz resonance with the 250 g screen mass. It is noted that although this stiffness was arbitrarily chosen to give the required resonance frequency, the values are within typical foam characteristics checked in the database.

FIG. 2 shows the variation of the simulated acceleration with frequency for the screen (LCD and touch screen) in response to a 1 W (2V) sinusoidal input to the exciter. One simulation (line 22) uses a suspension with zero damping and the other (line 24) with a more realistic value for the damping. In both cases, the magnet cup of the exciter is grounded, i.e. fixed, to the frame and a target acceleration of 20 m/s$^2$ at 100 Hz is achieved.

FIG. 3 shows the results of a simulation investigating the effect of using the exciter in both grounded (line 32) and inertial mode (line 34) (i.e. magnet cup not grounded to the reference frame). As shown, in the inertial mode, the resonance of the magnet on the exciter's suspension occurs at a frequency of 57 Hz. A third line 36 plots the effect of selecting the exciter suspension so that the exciter resonance corresponds to 100 Hz. FIG. 2 shows that mounting the exciter in inertial configuration increases the acceleration at the screen. This is further magnified by tuning the exciter resonance to coincide with the panel resonance.

FIG. 4 compares measured results (line 44) with simulated result (line 42) using the results of FIGS. 2 and 3. For the measurements, a simple test-bed mock up is constructed with the LCD panel (LCD screen and touch screen) mounted to a MDF board via foam strips around the perimeter of the panel. The sound pressure level (SPL) produced by a rigid piston is proportional to its acceleration. By knowing the area of the piston and the SPL for a given input (and measured at a given distance) it is possible to derive the acceleration that the piston must have been undergoing. As can be seen from FIG. 4 there is generally good agreement between the simulated and measured systems.

The SPL measurement was made in a standard room (i.e. not an anechoic chamber) so there is a noise contribution predominantly below about 250 Hz. There are also interactions from room reflections and/or standing waves in the SPL measured data.

From the combination of measurements and simulations presented in above, it appears that it should be possible to produce accelerations of the order of 20 m/s$^2$ for a typical 9" LCD display panel.

Figure 5:
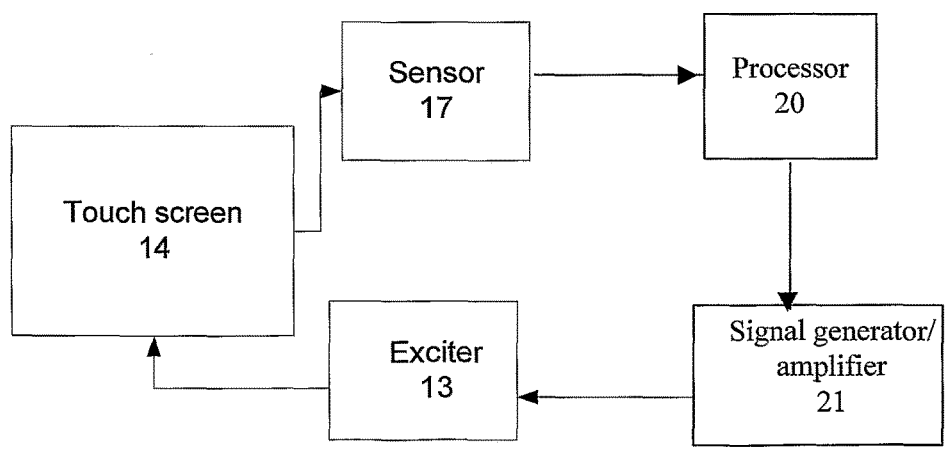
FIG. 5 shows a block diagram of the components of the system.

FIG. 5 shows as blocks, the components of the system. Contact on the screen may be detected and/or tracked by one or more sensors 17 which feed measurements to a processor 20 to obtain information about the contact, e.g. location or other characteristics as described in International patent applications WO 01/48684, WO 03/005292 and/or WO 04/053781 to the present applicant. These International patent applications are hereincorporated by reference. Alternatively, other known methods, including capacitive or resistive methods, may be used to receive and record or sense such contacts. Using the contact location, a signal generator/amplifier 21 provides a signal to the exciter 13 to drive the resonance in the touch screen 14.

Figure 6:
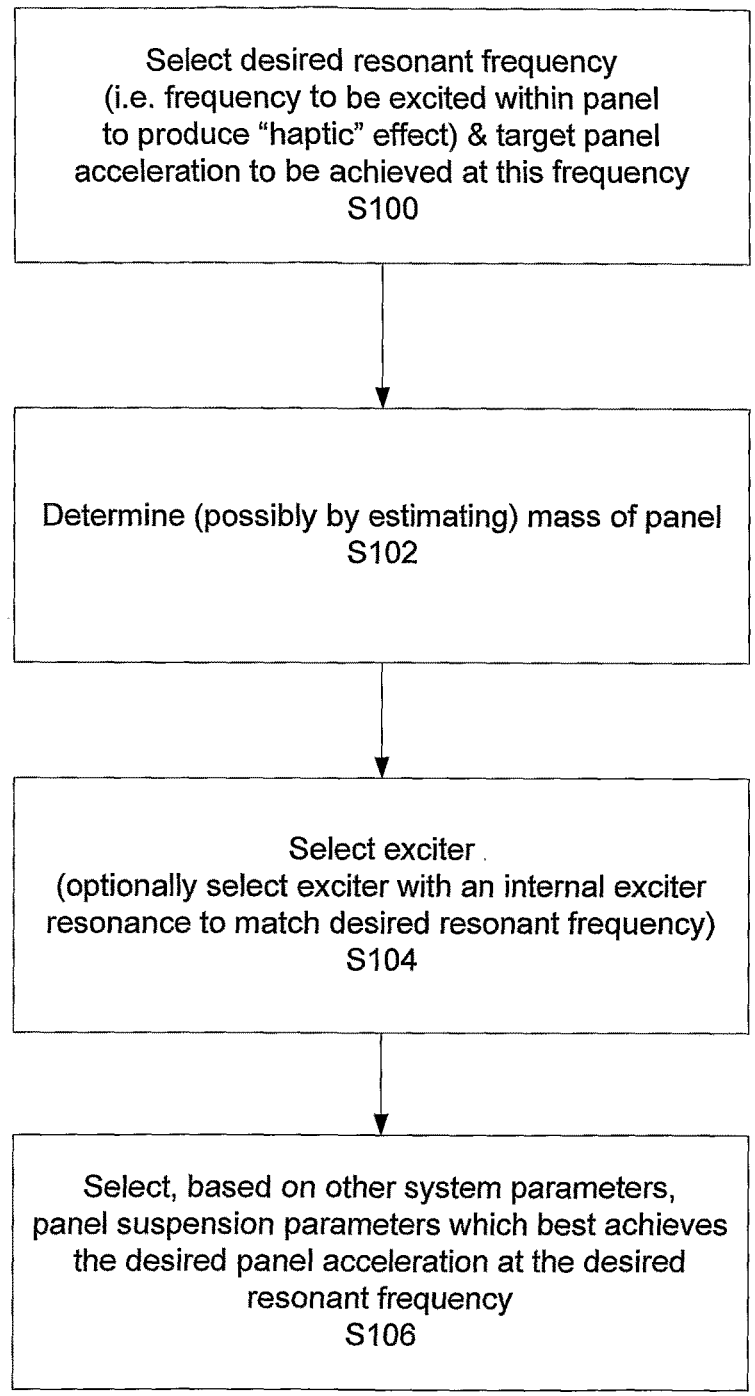
FIG. 6 shows a flow chart of the method steps for selecting parameters of a device shown in FIG. 1.

FIG. 6 summarises the method steps in selecting the system parameters which are used to make a device having a desired output. At step S100, the desired resonant frequency which is to be excited in the panel to produce the haptic sensation is set together with the desired panel acceleration at this frequency, i.e. of the order of 20 m/s at 100 Hz in the example above. At step S102, the mass of the panel (i.e. LCD screen and touch panel as above) is determined, perhaps by estimation based on the panel material and size. At step S104, an exciter to excite resonance in the panel, particularly at the selected resonant frequency is selected. In the above example, a standard low-profile exciter is selected. Optionally, the internal exciter resonance may be matched to the desired resonant frequency. Some areas for further optimisation and improvement have been suggested involving the mounting of the exciter and possibly tuning its suspension stiffness.

Finally, at step S106, the suspension parameters, including material and location on the panel, are selected to achieve the desired resonance based on the knowledge of the other parameters in the system. In FIG. 6, the parameters of the panel, exciter and suspension are all considered to achieve the optimal solution. This is a complex electromechanically coupled system where the elements of the system are considered as a whole to so as optimise performance. Some additional parameters of the combined system which may be taken into account are the electrical efficiency of the coupled system (e.g. to increase battery life where the system is so powered) and the mechanical footprint of the coupled system. However, it will be appreciated that appropriate selection of a subset of parameters, e.g. when some parameters are fixed, may achieve a useful but not necessarily optimal solution.

Figure 7:
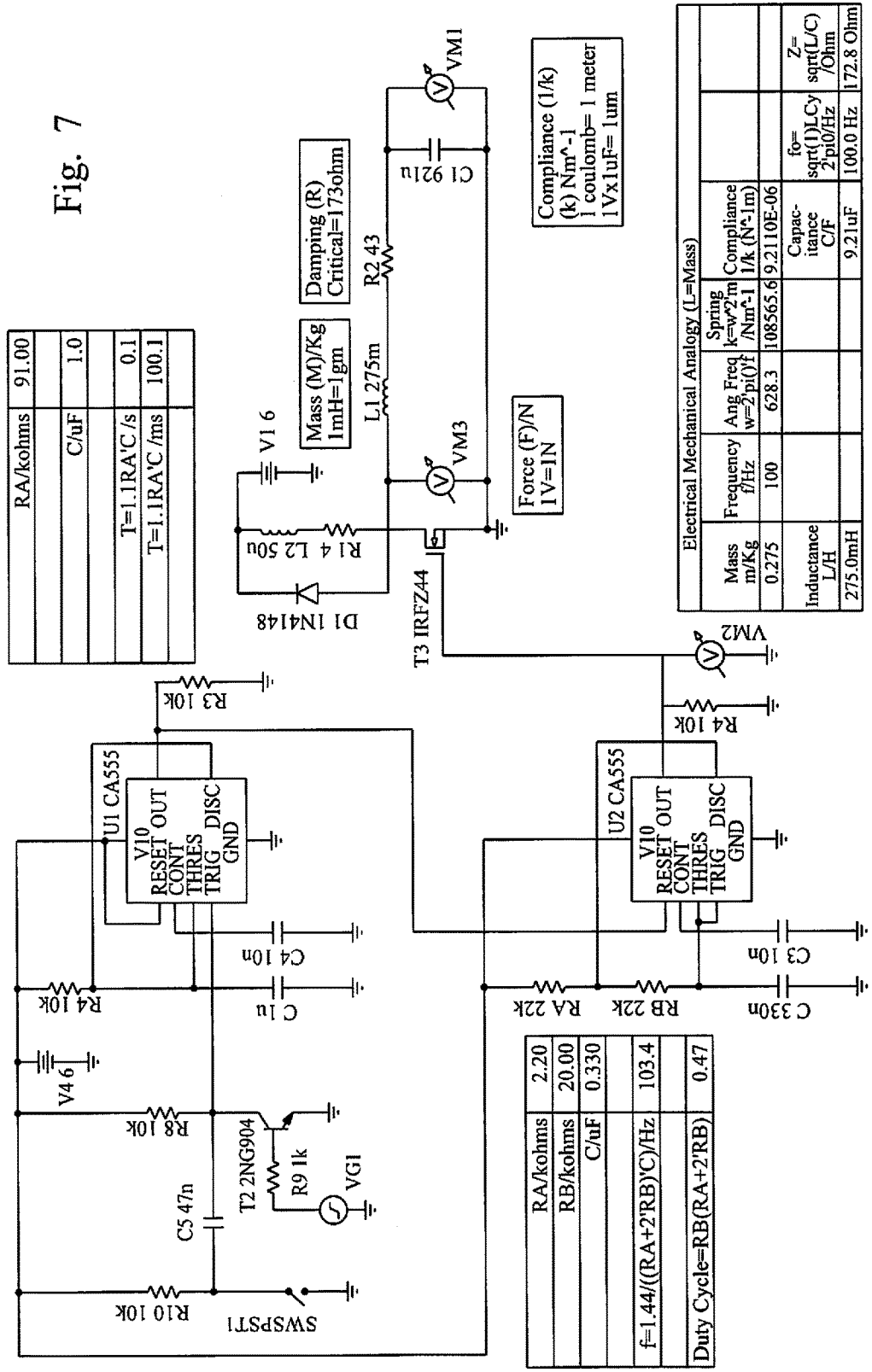
FIG. 7 is the circuit schematics for a simulation of the mechanical response of the system.

FIGS. 7 to 12 illustrate the selection of the electrical parameters for one of the exciters. FIG. 7 shows the detailed circuit schematics for simulating the mechanical response of the system near resonance (e.g. at 100 Hz). The parameters of the exciter are modelled on the right hand side of the drawing and show the mass of the exciter as an inductance L1, and the damping of the exciter as a resistor R2. The exciter is an open drain single end exciter driver. The left hand part of the circuit is the amplifier which is connected to the exciter via a MosFet (T3). Thus, the amplifier is a switching amplifier which may be turned off thus preventing conduction between source and drain and increasing electrical efficiency of the exciter.

The circuit may also be used for auto calibration to find a drive frequency near resonance by using the driving exciter as an input device. The fact that the MosFet drive transistor gets turned off facilitates monitoring panel displacements. (This would also work with a push-pull H-Bridge drive as well because after applying a driving pulse one would turn off all drive MosFets.) The motivation for doing auto calibration is to mitigate against the large temperature drift of the mechanical properties of typical supporting foams.

Figure 8:
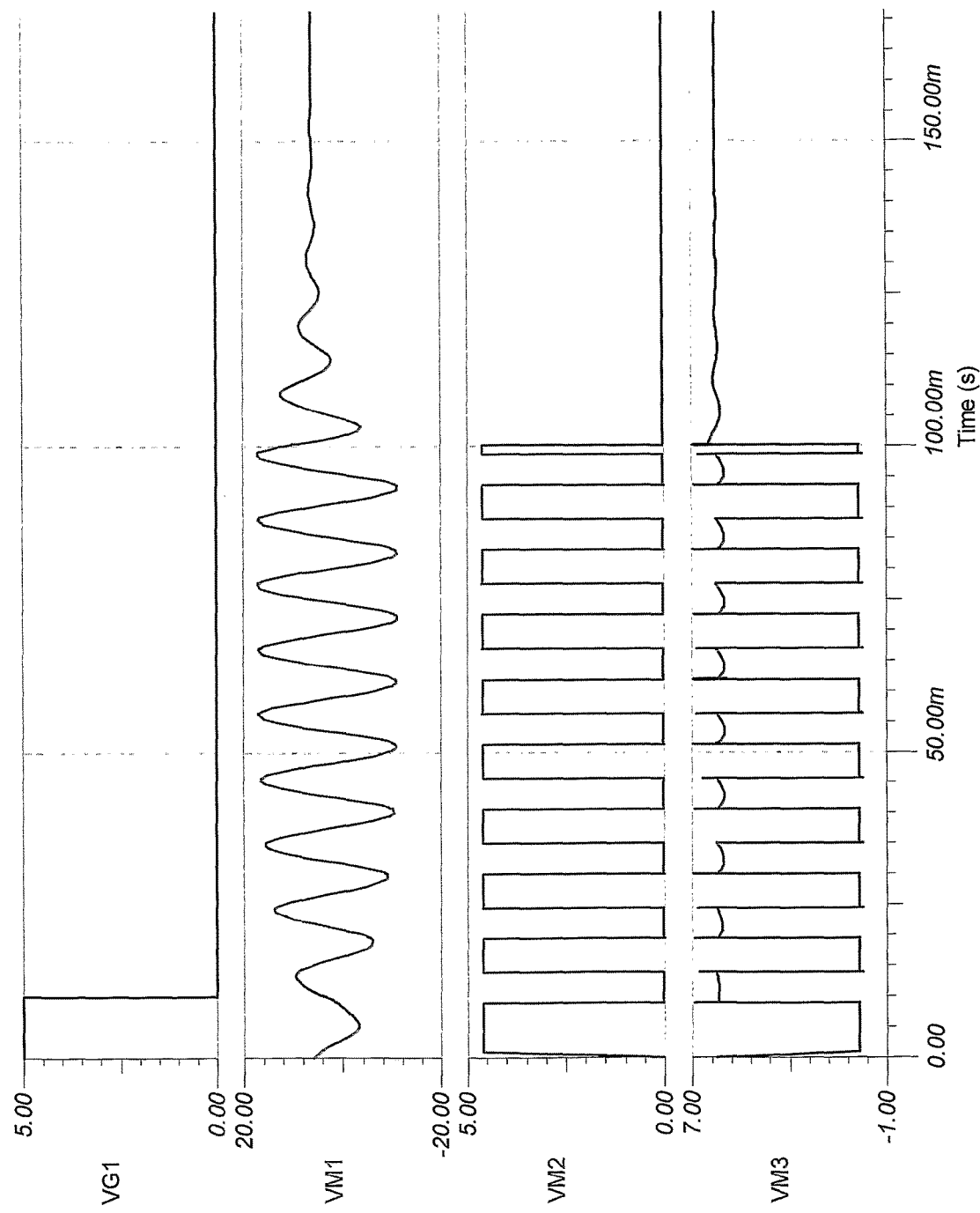
FIG. 8 shows the signals across various components in the circuit of FIG. 7 by plotting output against time near resonance (100 Hz)

FIG. 8 shows the different signals across various components in the circuit diagram of FIG. 7. An input trigger pulse is applied to VG1 as shown in the upper Figure. This has a duration of 10 ms and is of 5V. As shown in the third figure, a square wave pulse train is applied to the open drain MosFet (labelled T3 IRFZ44). This pulse train has an input pulse width of 100 ms and is approximately 4.5V. The output to the mechanical circuit which is the analogue of the exciter is shown in the lower figure (VM3). This is a modified square wave pulse train. These signals result in a voltage response (VM1) across capacitor C (C1921) which is equivalent to the displacement provided by the exciter.

As shown, the amplifier operates in cooperation with the moving mass (L1 275 m), electrical resistance (R2) and inductance (C1921) of the moving coil exciter and the coupled mass of the driven screen. In this way, a near square wave type of output shown in the third figure of FIG. 8 is converted to a low pass filtered waveform or more sine wave shape, suitable for haptic sensation, as shown in the second figure of FIG. 8. Thus there may be no need for lower efficiency Class B or Class A/B linear amplifier. Much higher system efficiency will be possible compared with an audio type linear amplifier The output has short duration 100 ms to form a pulse like signal to provide a button click sensation to a user's finger tip. There is considerable scope for developing the content of the signal used to generate the haptic pulse, and also optimisation of the electronics used to drive the exciter. For example, the touch actions performed by a user's finger may include gestures such as sweeps, pinches expansions, pushes, taps etc. The haptics signal may match each of these touch actions. Such matched signals are likely to be more complex (e.g. combination of pulses, provide variations in displacement and/or acceleration) so as to provide additional information to the user. These more complex signals could be provided by varying the input pulse train widths, the frequency of the square wave pulse train and/or the resistance of the exciter.

Figure 9:
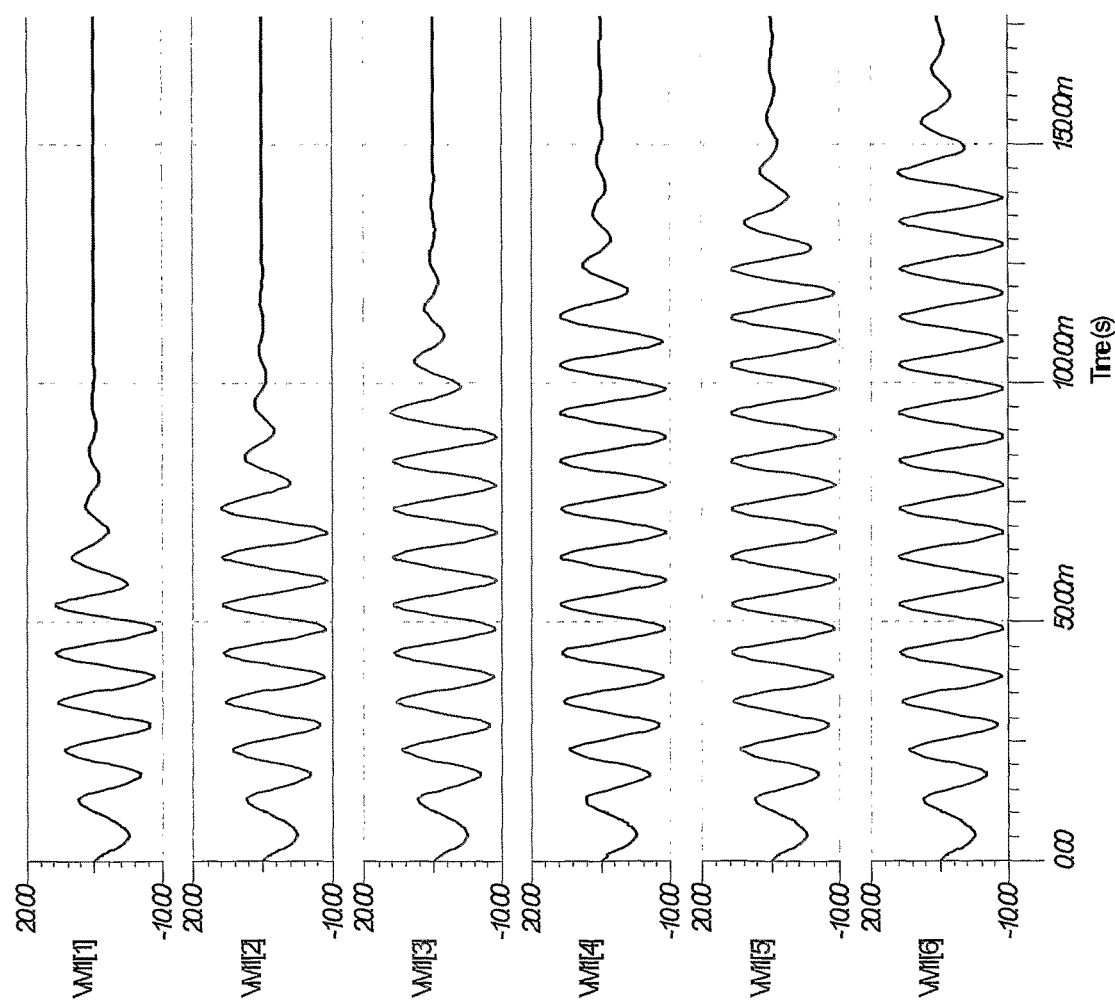
FIG. 9 shows the variation in the simulated mechanical response of the device with varying impulse train widths near resonance.

FIG. 9 shows how the output across VM1 varies with varying input pulse train widths. In the upper figure (VM1 [1]), the width of the input is set at approximately 55 ms and the lower figure (VM1[6]), the width of the input is set at approximately 145 ms. The other graphs show widths between these extremes.

Figure 10:
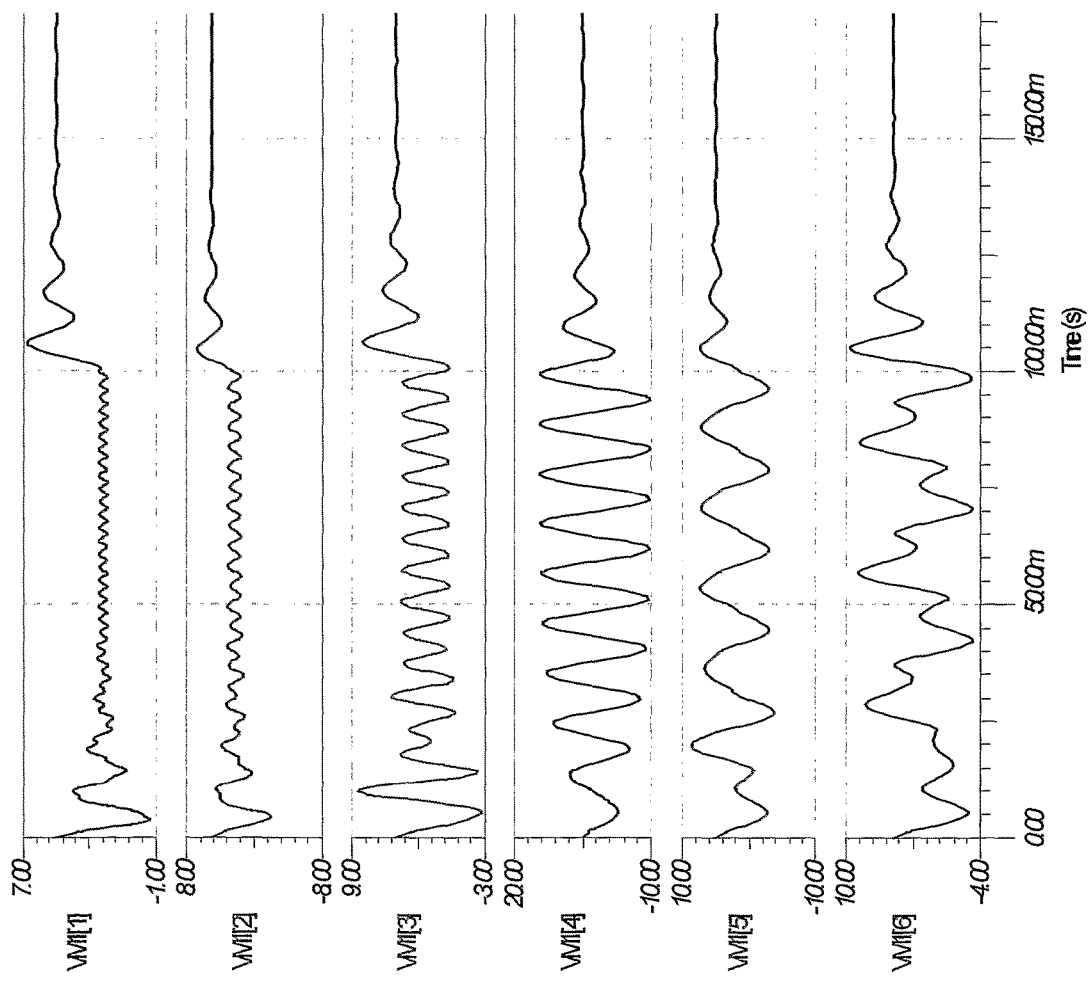
FIG. 10 shows the variation in the simulated mechanical response of the device with varying frequency.

FIG. 10 shows how the output across VM1 varies with changing frequency of the square wave pulse train. In the upper figure (VM1[1]), the frequency is set at 350 Hz and the lower figure (VM1[6]), the frequency is approximately 35 Hz. The other graphs show frequencies between these extremes. A frequency of 100 Hz is shown in the fourth figure (VM1[4]).

Figure 11:
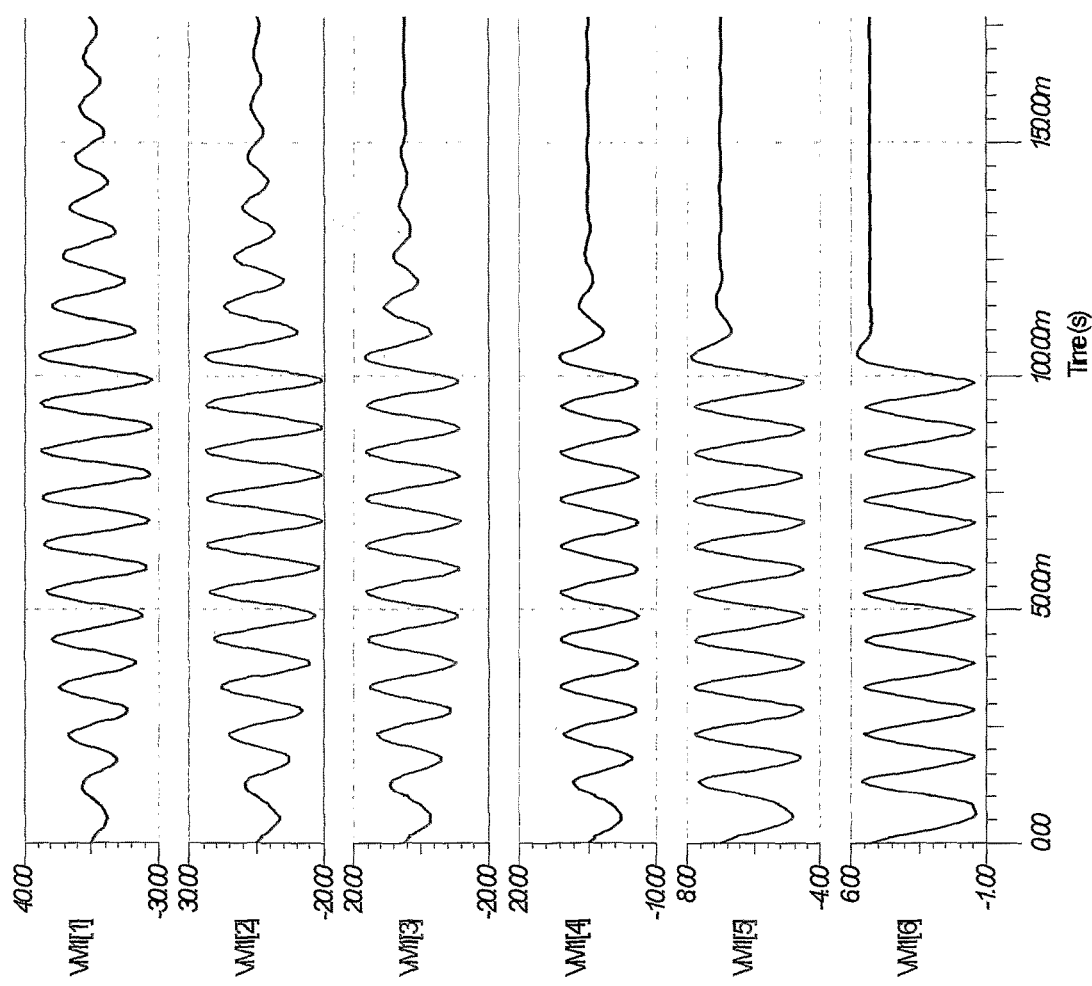
FIG. 11 shows the variation in the simulated mechanical response of the device with varying damping resistors.

FIG. 11 shows how the output across VM1 varies if the internal resistance (R2 in FIG. 7) of the exciter is changed. In the upper figure (VM1[1]), the resistance is set at 10 ohm and in the lower figure (VM1[6]), the resistance is set at 200 ohm. The other graphs show frequencies between these extremes.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of making a touch-sensitive data entry screen to provide haptic response to a user, the user's touch on the screen providing bending waves via at least one electromechanical exciter coupled to the touch-sensitive data entry screen, the method comprising
    mounting the touch sensitive data entry screen on a resilient suspension to form a mechanical and electromechanical coupled system;
    analyzing each of the touch-sensitive data entry screen, the resilient suspension and the at least one electromechanical exciter including the bending wave excitation to determine values of parameters of the mechanical and electromechanical coupled system to produce the haptic response; and
    selecting a resonant frequency of the at least one electromechanical exciter to substantially coincide with a resonant frequency of the resiliently mounted touch-sensitive data entry screen to provide a required displacement and acceleration of the touch-sensitive data entry screen at a low frequency.

2. A method according to claim 1, wherein the values have been selected to improve electrical efficiency of the mechanical and electromechanical coupled system.

3. A method according to claim 1, wherein the values have been selected to reduce a mechanical footprint of the mechanical and electromechanical coupled system.

4. A method according to claim 1, applied to the touch-sensitive data entry screen having a size of at least 200 mm.

5. A method according to claim 1, wherein the touch-sensitive data entry screen has a mass of at least 200 gms.

6. A method according to claim 1, wherein the required screen acceleration ranges from 5 to 50 m/s$^2$.

7. A method according to claim 6, wherein the acceleration is of the order of 20 m/s$^2$.

8. A method according to claim 1, wherein both the touch-sensitive data entry screen surface and exciter coupled resonance have been analysed.

9. A method according to claim 1, comprising coupling at least one exciter such that the touch-sensitive data entry screen is excitable into out-of-plane movement.

10. A method according to claim 1, comprising coupling at least one exciter such that the touch-sensitive data entry screen is excitable into in-plane movement.

11. A method according to claim 1, comprising coupling at least one exciter such that the touch-sensitive data entry screen is excitable into rocking displacement.

12. A method according to claim 1, wherein at least one exciter is of the magnetically polarised or piezoelectric kind.

13. A method according to claim 1, comprising arranging a plurality of exciters to operate in a co-ordinated fashion.

14. A method according to claim 1, wherein a complex haptic signal to at least one exciter is providable to provide additional information to the user.

15. A method according to claim 1, comprising providing a switching amplifier to feed haptic signals to at least one exciter.

16. A method according to claim 15, comprising arranging the switching amplifier to output a signal in the form of a low pass filtered waveform.

17. A method according to claim 16, wherein the low pass filtered waveform at least approximates to a square waveform.

18. A touch screen apparatus for providing haptic responses to a user, said screen comprising:
    a panel selected to have a predetermined mass and a target resonant frequency and acceleration, the target resonance and acceleration selected to have a low frequency;
    at least one electromechanical exciter coupled to the panel for producing bending waves excited by the user's touch, the least one electromechanical exciter being selected to match the target resonant frequency;
    a resilient suspension selected to provide the targeted panel acceleration and resonance, when coupled to the panel forms a mechanical and electromechanical coupled system.

19. Apparatus according to claim 18, comprising apparatus for producing an acoustic signal.

20. Apparatus according to claim 19, comprising a bending wave loudspeaker.

21. Apparatus according to claim 18, comprising an electronic display.

22. Apparatus according to claim 18, comprising a switching amplifier for feeding haptic signals to the or each exciter.

23. A method of selecting parameters which are used to make a touch-sensitive data entry screen of the kind arranged to provide haptic response to a user via at least one electromechanical exciter coupled to the touch-sensitive data entry screen, and in which bending waves are excited in the touch-sensitive data entry screen in response to human touch, the touch-sensitive data entry screen being resiliently mounted on a suspension to form a mechanical and electromechanical coupled system, the method comprising:
    analysing the mechanical and electromechanical coupled system represented by the touch-sensitive data entry screen, the suspension and the at least one exciter including the bending wave excitation in the resiliently mounted touch-sensitive data entry screen,
    selecting values of parameters of the coupled system to provide a required displacement and acceleration of the touch-sensitive data entry screen at low frequency and such that a resonant frequency of the at least one electromechanical exciter substantially coincides with a resonant frequency of the resiliently mounted touch-sensitive data entry screen.

24. A method for selecting values of parameters for making a touch-sensitive data entry screen providing haptic response to a user, the screen including at least one electromechanical exciter coupled to the screen and bending waves excited by the user's touch, said method comprising the steps of:
    setting a predetermined resonant frequency together with a predetermined panel acceleration having the same frequency, the resonant frequency being excited in the panel to produce a haptic sensation, the resonant frequency being a low frequency;

determining a mass of the panel having the touch-sensitive data entry screen;

selecting a exciter to excite resonance in the panel, an internal exciter resonance may be matched to the desired resonant frequency;

selecting panel suspension parameters to provide the predetermined panel acceleration at the desired resonant frequency;

resiliently mounting the touch screen data entry screen on the selected suspension to form a mechanical and electromechanical coupled system; and providing the required displacement and acceleration of the data entry screen at the low frequency such that a resonant frequency of the at least one electromechanical exciter substantially coincides with a resonant frequency of the resiliently mounted touch-sensitive data entry screen.

* * * * *